United States Patent
Serdynski et al.

(10) Patent No.: US 10,720,765 B2
(45) Date of Patent: Jul. 21, 2020

(54) SYSTEM FOR ISOLATING POWER CONDUCTORS USING SLIDABLE INSULATING SHEETS

(71) Applicant: Rockwell Automation Technologies, Inc., Mayfield Heights, OH (US)

(72) Inventors: David P. Serdynski, Waukesha, WI (US); Dean T. Meyer, Oak Creek, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 156 days.

(21) Appl. No.: 16/133,103

(22) Filed: Sep. 17, 2018

(65) Prior Publication Data
US 2020/0091696 A1    Mar. 19, 2020

(51) Int. Cl.
| | |
|---|---|
| *H02G 5/02* | (2006.01) |
| *H02B 1/14* | (2006.01) |
| *H02B 1/20* | (2006.01) |
| *H02B 1/21* | (2006.01) |
| *F16B 33/00* | (2006.01) |

(Continued)

(52) U.S. Cl.
CPC .............. *H02G 5/025* (2013.01); *H02B 1/14* (2013.01); *H02B 1/207* (2013.01); *H02B 1/21* (2013.01); *F16B 33/004* (2013.01); *H02G 3/081* (2013.01); *H02G 3/14* (2013.01)

(58) Field of Classification Search
CPC .......... H02G 5/025; H02G 3/14; H02G 3/081; H02G 5/00; H02G 5/002; H02G 5/02; H02G 5/066; H02G 5/068; H02G 3/08; H02G 3/0437; H02B 1/14; H02B 1/207; H02B 1/21; H02B 1/00; H02B 1/01; H02B 1/011; H02B 1/012; F16B 33/004; H05K 5/04; H05K 5/02; H05K 5/00; H05K 7/14; H05K 7/1401; H01B 3/00
USPC ......... 174/148, 135, 72 B, 71 B, 88 B, 70 B, 174/99 B, 129 B, 133 B, 149 B, 68.2, 174/174, 137 R; 361/600, 601, 605, 611,
(Continued)

(56) References Cited

U.S. PATENT DOCUMENTS

| | | | | |
|---|---|---|---|---|
| 3,924,161 A | * | 12/1975 | Olashaw | ................. H02B 1/21 174/71 B |
| 4,242,718 A | * | 12/1980 | Shariff | ..................... H02B 1/21 174/70 B |

(Continued)

FOREIGN PATENT DOCUMENTS

DE    20 2013 001 247 U1    5/2013

OTHER PUBLICATIONS

Extended European Search Report dated Jan. 7, 2020 for Application No. EP19197738.8.

*Primary Examiner* — Angel R Estrada
(74) *Attorney, Agent, or Firm* — Fay Sharpe LLP

(57) ABSTRACT

A system for isolating a power conductor includes a power conductor that extends between first and second flanking support structures. First and second collars are connected respectively to the first and second flanking support structures. The first and second collars each at least partially surround the power conductor and including respective first and second open tracks that cooperate with each other to define a sheet-receiving slot. An electrically insulating/insulative sheet is located in the sheet-receiving slot and extends continuously between the first and second collars. The sheet is secured in covering relation with the power conductor.

19 Claims, 14 Drawing Sheets

(51) Int. Cl.
*H02G 3/08* (2006.01)
*H02G 3/14* (2006.01)

(58) Field of Classification Search
USPC .............. 361/637, 639, 648, 675, 641, 664;
439/212, 213, 114, 210
See application file for complete search history.

(56) References Cited

U.S. PATENT DOCUMENTS

| | | | | |
|---|---|---|---|---|
| 5,854,445 | A | * | 12/1998 | Graham ................ H02G 5/007 |
| | | | | 174/99 B |
| 8,339,772 | B2 | * | 12/2012 | Peralta .................... H02G 5/10 |
| | | | | 174/16.2 |
| 8,420,935 | B2 | * | 4/2013 | Malkowski, Jr. ........ H02B 1/21 |
| | | | | 174/68.2 |
| 9,646,738 | B2 | | 5/2017 | Serdynski |
| 9,667,041 | B2 | * | 5/2017 | Pochopien ............... H02B 1/21 |
| 9,917,432 | B2 | | 3/2018 | Serdynski et al. |
| 2017/0098489 | A1 | | 4/2017 | Serdynski et al. |

* cited by examiner

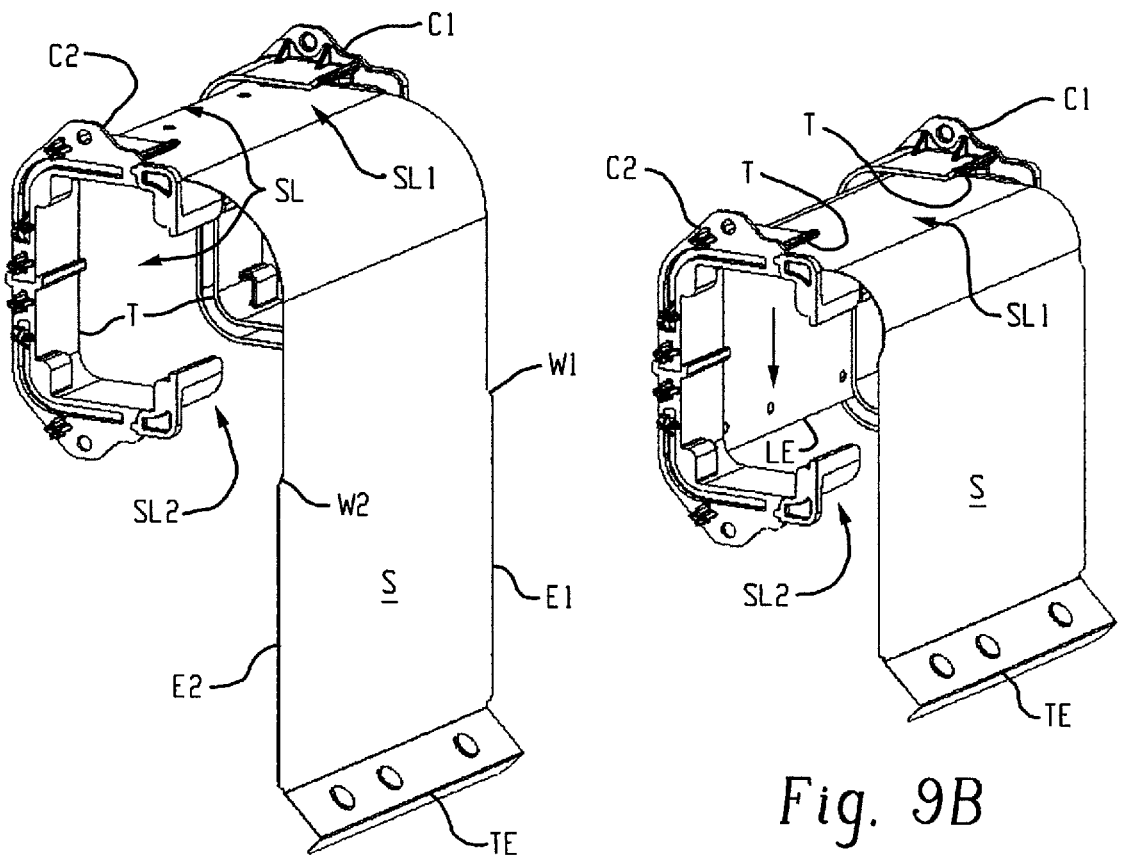
Fig. 9A
Fig. 9B
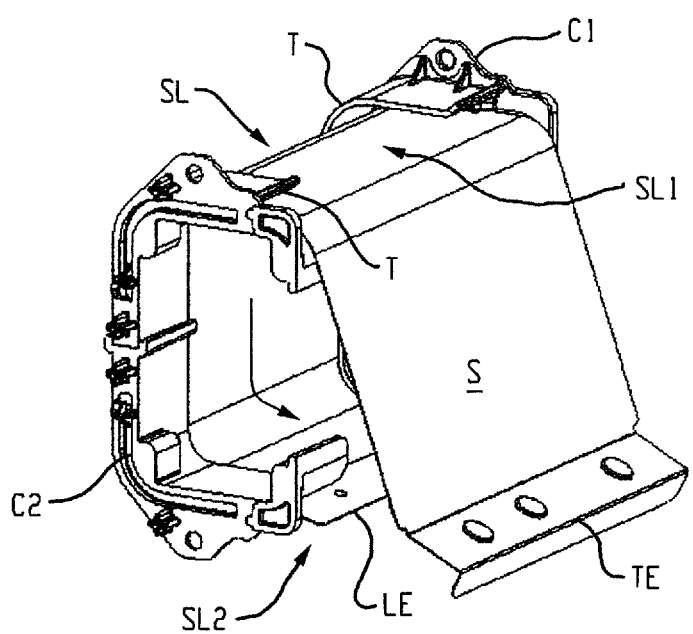
Fig. 9C

SYSTEM FOR ISOLATING POWER CONDUCTORS USING SLIDABLE INSULATING SHEETS

BACKGROUND INFORMATION

The present invention relates generally to electrical systems, such as for the distribution of power to controlled equipment, and more particularly, to electrical isolation in such systems.

BACKGROUND OF THE INVENTION

Electrical systems with packaged electrical and electronic components are known and are in use. For example, Motor Control Centers (MCC's) are used for power and data distribution in large and industrial operations. In MCC's, a variety of components, such as switchgear, semiconductor power electronic circuits, programmable logic controllers, motor controllers, and the like, are housed in large electrical enclosures that may be subdivided into sections or columns, which may be further subdivided into compartments. The MCC includes associated bus bars, interconnections and supporting structures for distribution of electrical power to the various compartments.

Typically, the MCC is connected to a main power line that feeds three-phase AC power to horizontal bus bars of the MCC. The horizontal bus bars, in turn, feed the three-phase power to vertical bus bars disposed in each of the sections or columns of the MCC. The vertical bus bars, in turn, feed the three-phase power to various units (which typically include electrical components) that are installed in compartments of a section. The units, in turn, may provide power terminals (conductors), such as copper bus bars, for feeding the three-phase power to a system environment, such as motors, as may be required for various applications.

However, in order to meet minimum electrical short-circuit protections, such as in accordance with International Electrotechnical Commission (IEC) and/or Underwriters Laboratories (UL) standards such as IP3XD and the like, power conductors should be sufficiently insulated and/or mounted with adequate distance from other conductive parts (including neighboring power conductors). Accomplishing this within the access and/or dimension constraints of the MCC and/or constituent components of the MCC is particularly challenging. A need therefore exists to provide minimum electrical short-circuit protections within such access and/or dimension constraints.

SUMMARY OF THE INVENTION

The present inventors have recognized that an improved electrical system is provided by electrically isolating complex bus geometries by using one or more electrically insulating sheets that fit and are easily installed within the constraints of preconfigured electrical system components without the need for redesigning such components. The sheet has a dielectric strength per mil effective to isolate power conductors based on maximum charge and proximity of the power conductors. Accordingly, exposed power conductors in electrical systems are electrically isolated from one another when covered by a sheet in accordance with the present invention. As a result, an improved electrical system is provided that is less susceptible to "arc flash" (a phenomena in which a luminous discharge of current is formed when a current jumps a gap, through air or gas, in a circuit or between two conductors) and/or other hazards.

The electrically insulating sheets may also contain openings or apertures allowing the sheets to be connected to various areas, such as to structural mountings in electrical system, to other sheets, and/or to the same sheet, itself. Such connections may be made, for example, by way of clips, such as nylon arrow clips, push-in fasteners, canoe clips, rivets. Alternatively, such connections may be made by way of tabs designed into the sheet itself which may be positively retained by slits in various areas (which may also be designed into the sheet itself). In another embodiment, the relevant portions of the sheet can be adhered to each other using an adhesive.

Each sheet may be created from an electrically insulating polymeric sheet material such as a polypropylene or another suitable polymeric sheet material having a dielectric strength per mil effective to isolate power conductors.

In accordance with one aspect of the present development, a system for isolating a power conductor includes a power conductor that extends between first and second flanking support structures. First and second collars are connected respectively to the first and second flanking support structures. The first and second collars each at least partially surround the power conductor and including respective first and second open tracks that cooperate with each other to define a sheet-receiving slot. An electrically insulating/insulative sheet is located in the sheet-receiving slot and extends continuously between the first and second collars. The sheet is secured in covering relation with the power conductor.

Another aspect of the present development includes a method for isolating a power conductor that extends between first and second flanking support structures. The method includes connecting first and second collars respectively to the first and second flanking support structures such that the first and second collars each at least partially surround the power conductor and such that respective first and second open tracks of the first and second collars are arranged in opposed facing relation so as to define a sheet-receiving slot adapted to receive an electrically insulative flexible sheet. The method further includes slidably inserting an electrically insulative flexible sheet into the sheet-receiving slot so that said electrically insulative flexible sheet extends continuously between the first and second collars and forms a tubular structure arranged in covering relation with the power conductor between the first and second collars.

In accordance with a further aspect of the present development, a system for isolating an associated power conductor includes first and second collars adapted to be connected respectively to first and second associated support structures with the first and second collars each at least partially surrounding an associated power conductor. The first and second collars include respective first and second open tracks that cooperate with each other to define a sheet-receiving slot. An electrically insulative sheet is adapted to be located in the sheet-receiving slot and define a tubular insulating structure that extends continuously between the first and second collars in covering relation with the associated power conductor.

These and other features and advantages of the present development will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

FIGS. 9A-9D are isometric views that progressively illustrate a process for installing each electrically insulating sheet S in the system for isolating the spliced conductor assemblies in accordance with one embodiment of the present development;

DETAILED DESCRIPTION

Figure 1:
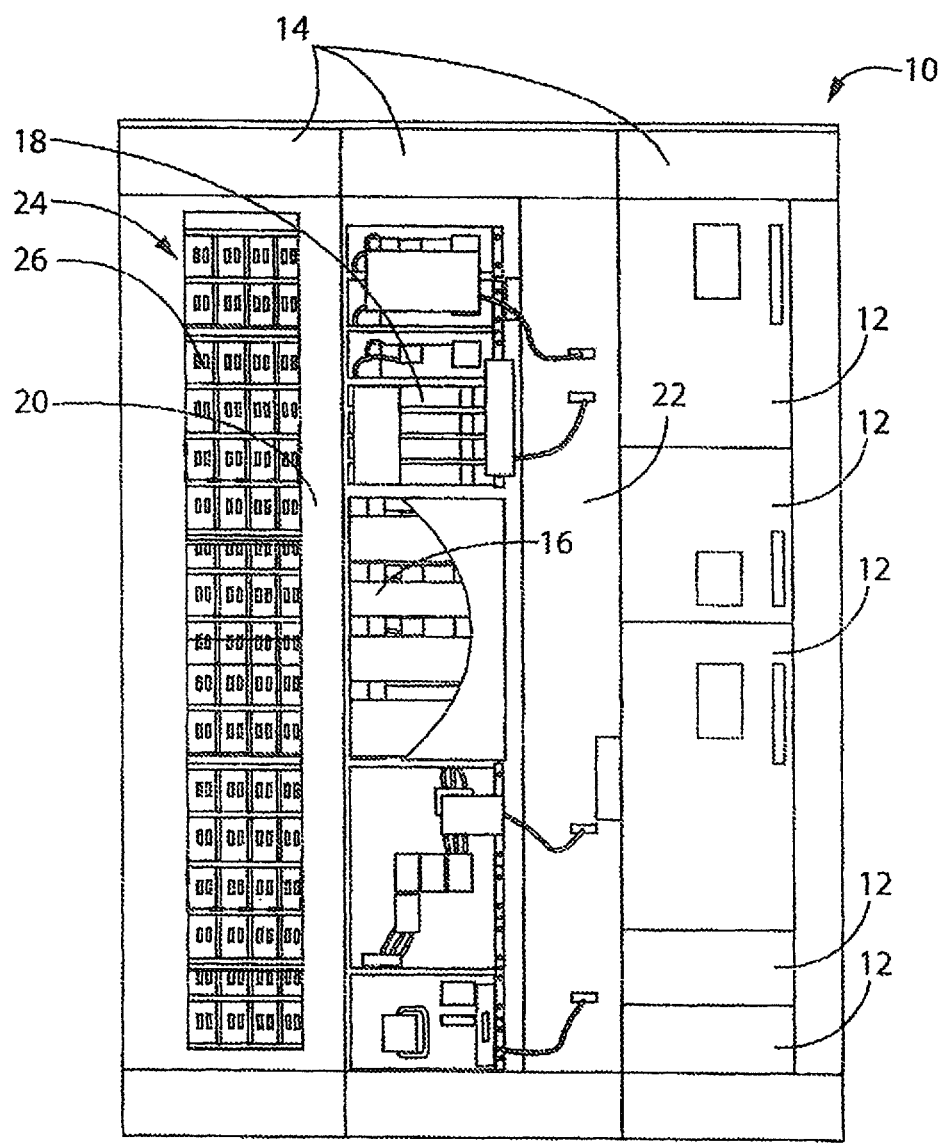
FIG. 1 is an exemplary known electrical system in which electrical units of various types may be housed in accordance with an aspect of the invention.

FIG. 1 illustrates an example of an electrical system 10 is in which electrical units 12 of various types may be housed. The electrical system 10 may be, for example, a Motor Control Center ("MCC") or other industrial, commercial, marine, or other electrical system. In general, the electrical system 10 may provide one or more sections 14, each forming a shell around a device mounting volume for supporting the units 12. The shell may be made of any suitable material, such as heavy gage sheet metal, reinforced plastics, and so forth. The electrical system 10 may typically receive three-phase power from an external power supply, such as a power supply grid, and/or data signals, via appropriate conduits (not shown), and distribute the received power and/or data signals to one or more of the sections 14 in various manners. The sections 14 may be electrically isolated from one another, or alternatively, may be electrically joined with other sections 14, such as via common horizontal power buses 16.

The units 12 may each include a door for covering an assembly of components 18 that are supported within each unit 12 via known methods, such as screwed or snap-in engagement, thereby providing mechanical and electrical connection to the electrical system 10. Exemplary components 18 of the units 12 may include relays, motor starters, and Programmable Logic Controllers ("PLC's"), among others. Doors for the units 12 may include, for example, a lever for opening the door, a lock for preventing the door from opening, and/or light for indicating a safe condition for opening the door. A latch rail (not shown) may be provided in each section 14 to interface with latches on the individual doors of the units 12.

The sections 14 may also include wire-ways 20 in which line and load wiring, cabling and the like may be installed to service the components 18. The sections 14 may optionally include preconfigured isolation areas 22 for variations in which greater electrical isolation between sections 14 is desired.

Along a rear wall of each of the sections 14 may be disposed a vertical bus system 24 configured to facilitate distribution of power throughout a corresponding section 14, such as in a plug-in manner. The bus system 24 may be generally formed as a backplane having slots 26 for receiving conventional stab-type electrical connections on rear surfaces of device supports received within a section 14. Such slot and stab arrangements are generally known in the art. As illustrated, the slots 26 may be divided into pairs to receive a corresponding two-pronged stab for each phase of electrical power. Rows of such slots 26 may be provided to allow device supports to be mounted at various levels within a section 14.

Figure 2:
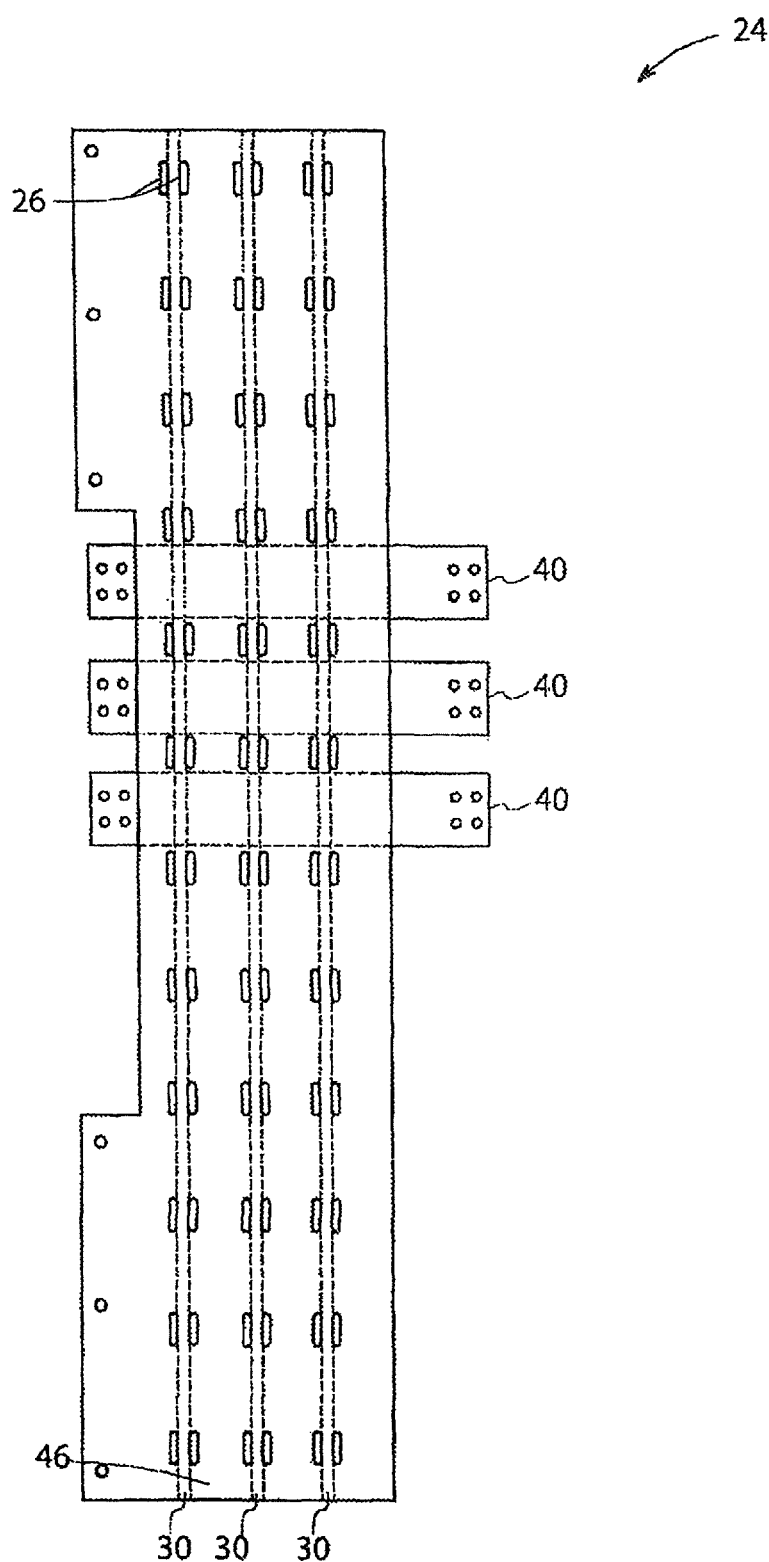
FIG. 2 is an exemplary known bus system which may be included within a section of the electrical system of FIG. 1.

Referring now also to FIG. 2, an exemplary configuration of the bus system 24 of FIG. 1 is provided. The bus system 24 may include multiple power busses disposed within a section 14. In the illustrated embodiment, the bus system 24 includes first, second and third vertical bus conductors 30 disposed proximal to one another, which may correspond to differing phases of a three-phase power system (power conductors). Further, the bus system 24 includes first, second and third horizontal bus conductors 40 disposed proximal to one another, which may also correspond to the differing phases of the three-phase power system (power conductors), but in a different direction.

In certain embodiments, the horizontal bus conductors 40 could be coupled to cabling that supplies three-phase power from an external power supply, such as a power supply grid, and the first, second and third horizontal bus conductors 40 could be respectively coupled to the first, second and third vertical bus conductors 30. Also, in certain embodiments, the horizontal bus conductors 40 of one section could be coupled (or "spliced") with the horizontal bus conductors 40 of another (flanking) section. In alternative embodiments, more horizontal and/or vertical bus conductors could be provided, such as for providing a neutral conductor, protective earth, ground or additional power phase, or fewer horizontal and/or vertical bus conductors could be provided, as appropriate for the environment.

The bus system 24 may include a bus cover 46 and a rear bus support 50 (see FIG. 3) that will be described in greater detail below. In the illustrated embodiment, the bus cover 46 may include a molded sheet of synthetic material disposed over the vertical and horizontal bus conductors and may serve to prevent contact with underlying power busses except through the slots 26. The vertical bus conductors 30 are typically made of a metal bar stock or tubing stock with a flat area that permits them to be mechanically and electrically coupled to corresponding horizontal metal bus conductors 40 in the bus system 24.

Connection of component supports (such as mounted on plates or drawers, not shown) may be made by two pronged stabs that are received through the slots 26 and engage the individual bus bars behind the bus cover 46. As described above, the bus system 24 further includes a bus support configured to support the vertical and horizontal bus conductors that is described in detail below with reference to FIG. 3.

Figure 3:
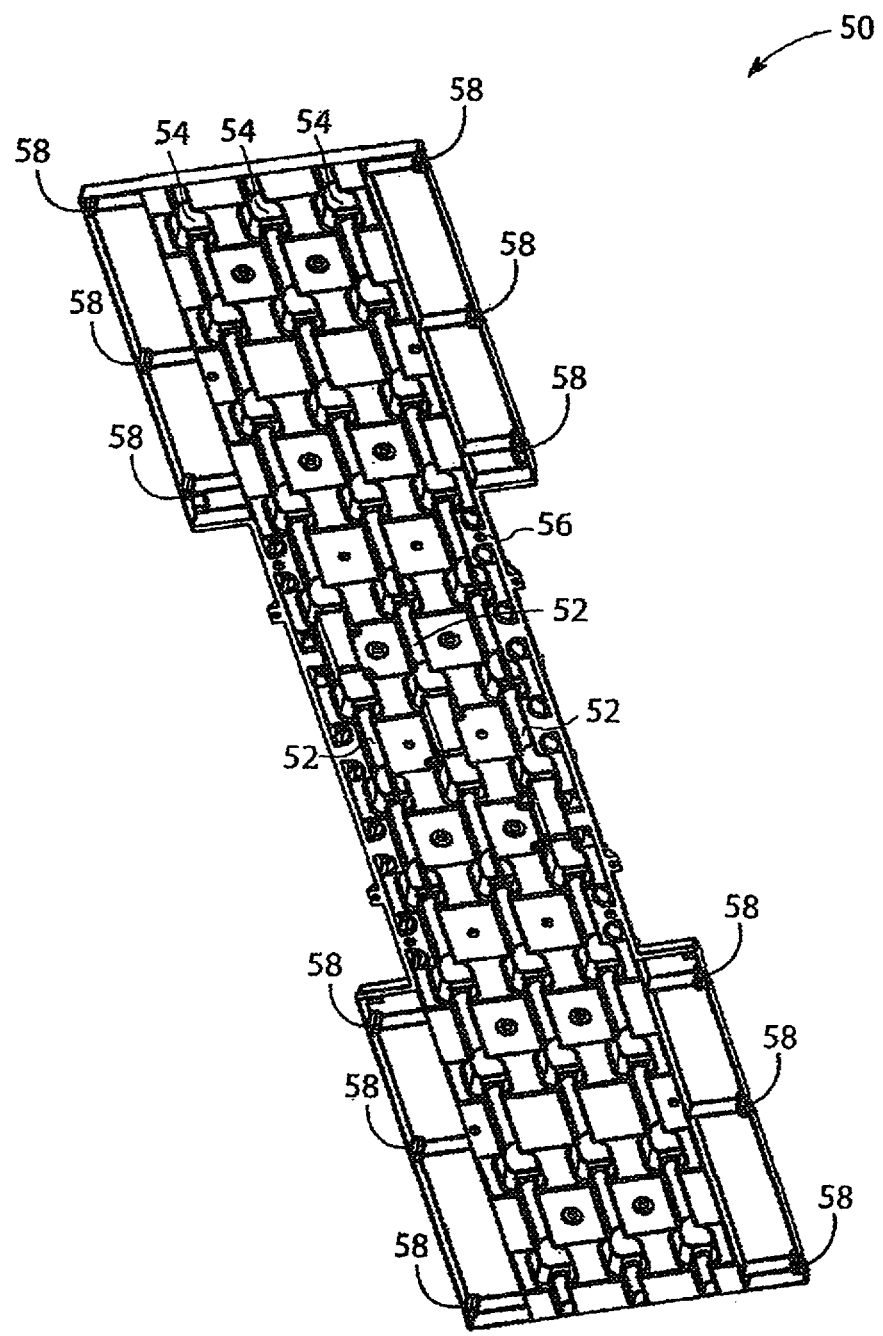
FIG. 3 is an exemplary known preconfigured isolated bus support which may support power busses of the bus system of FIG. 2.

Referring now to FIG. 3, an exemplary preconfigured isolated bus support 50 is illustrated for supporting the power buses of the bus system 24 of FIG. 2. As illustrated, the bus support 50 may be a molding with vertical channels 52 to receive the vertical bus conductors 30 of FIG. 2. Each of the vertical channels 52 may include rear protrusions 54 on a rear side 56 of the bus support 50. In the illustrated embodiment, the bus support 50 mechanically supports the various horizontal and vertical bus conductors. Within the bus system 24, and generally between the bus support 50 and the bus cover 46 (see FIG. 2), each vertical bus conductor may generally include a connection portion that is engaged by stabs of component supports and a bus anchoring portion.

Accordingly, the horizontal bus conductors 40 (see FIG. 2) may be generally supported on a rear surface of the bus support 50, while the vertical bus conductors 40 (see FIG. 2) may be supported on a front surface thereof. In the illustrated embodiment, the bus support 50 includes a series of apertures 58 or holes for receiving mounting bolts or screws. These apertures 58 will generally be aligned with corresponding apertures in rear of the electrical system 10 to support the bus system 24 when mounted therein. The vertical bus conductors 30 may be received within corresponding recesses of the vertical channels 52. The recesses may generally be semicircular grooves in which the vertical bus conductors 30 may lie.

Opposing the rear protrusions 54, which may be somewhat deeper than the recesses, are pockets designed to receive and accommodate stabs (not shown) of component supports that will protrude through the slots 26 in the bus cover 46. Furthermore, the bus support 50 may include a series of apertures (not shown) that extend completely through the bus support 50 for mechanical and electrical connection to the horizontal bus conductors 40.

In the illustrated embodiment, the bus support 50 may be formed as a single piece of molded plastic material. The material is preferably one that will not degrade or melt with elevated temperatures that may occur during normal operation. In certain embodiments, the bus support 50 may comprise glass filled polyester, a thermoset plastic. The bus support 50 could also include add-on bus support braces (not shown) disposed on the rear side of the bus support which may be configured to contact the channels to limit movement of the vertical bus conductors during a high current event.

Figure 4:
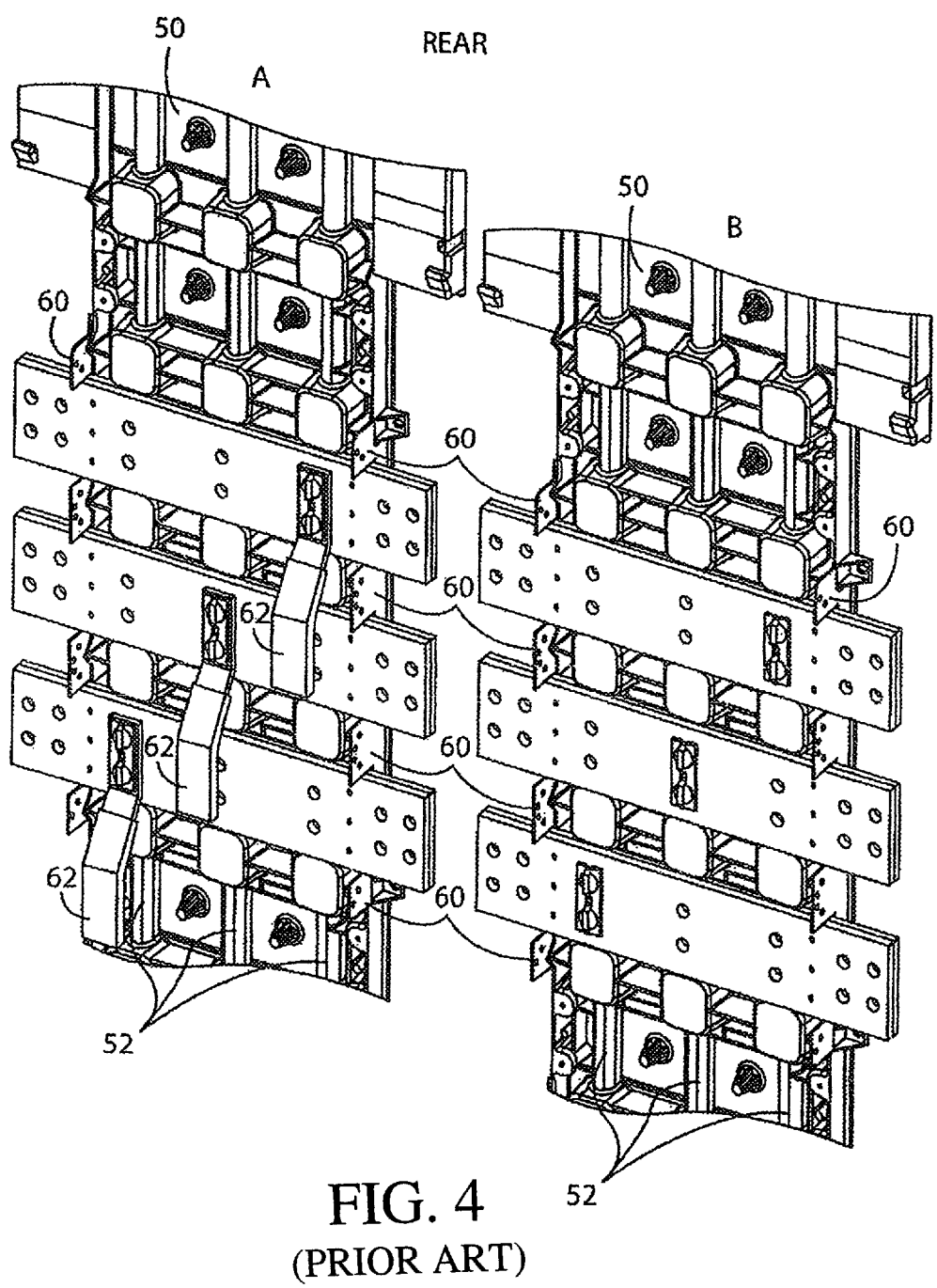
FIG. 4 is a rear view of known flanking bus supports, each with horizontal bus conductors disposed thereon in accordance with an aspect of the invention.

Referring now to FIG. 4, a rear view of flanking bus supports 50 (identified as first and second bus supports "A" and "B"), each with horizontal bus conductors 40 disposed thereon, is provided. Bus supports A and B may be provided, for example, in adjacent or flanking sections 14 in the electrical system 10. In the configuration as shown, the horizontal bus conductors 40 of bus support A are disconnected and electrically separate from the horizontal bus conductors 40 of bus support B. A vertical insulating barrier or vertical insulator 60 may be provided on each of the edges of the bus supports A and B, connected to the bus supports A,B or otherwise provided as a part thereof, with the vertical insulator 60 being contoured around the horizontal bus conductors 40 to provide electrical isolation and protection in gaps between the horizontal bus conductors 40. In addition, a flexi-bar 62 or insulated cables may be fastened to each horizontal bus conductor 40 to provide a respective electrical power phase to the horizontal bus conductor 40 from the external power supply received by the electrical system 10.

Figure 5:
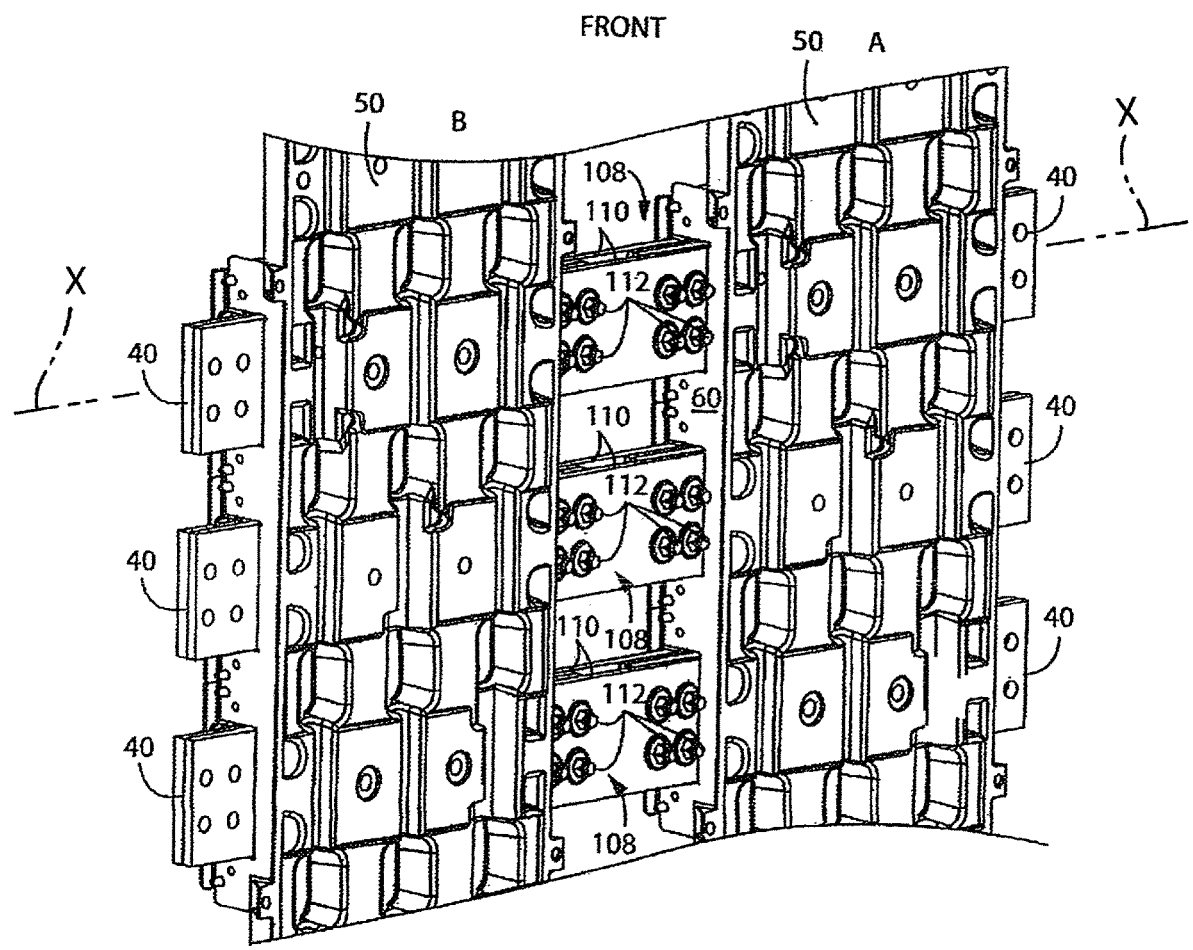
FIG. 5 is a front view of the flanking bus supports of FIG. 4 further including known splice conductor assemblies to electrically connect pairs of adjacent or flanking horizontal bus conductors.

Referring now to FIG. 5, a front view of the first and second flanking bus supports A and B of FIG. 4 is provided in which the horizontal bus conductors 40 of bus support A may be electrically connected to (or "spliced" with) the horizontal bus conductors 40 of bus support B using one or more electrically conductive splice plates 110 to form a spliced conductor assembly 108. The spliced conductor assembly 108 comprises one or more installed splice plates 110 and the flanking horizontal bus conductors 40 of bus supports A,B electrically and physically connected together by the splice plate(s) 110 using a plurality of fasteners such as threaded bolts sometimes referred to as bus clamps 112. The splice plates 110 typically comprise metal plates. A single splice plate 110 may be used to connect neighboring or flanking horizontal bus conductors 40 with lower current ratings, such as 600-1200 Amps. Alternatively, multiple splice plates 110 (such as front and back as shown herein) may be used to connect neighboring or flanking horizontal bus conductors 40 with higher current ratings, such as 1600-3000 Amps. The bus conductors 40 and splice plates 110, and the spliced conductors assembly 108 defined thereby, extend along and include a longitudinal axis X that extends between the first and second flanking bus supports A,B.

Figure 6:
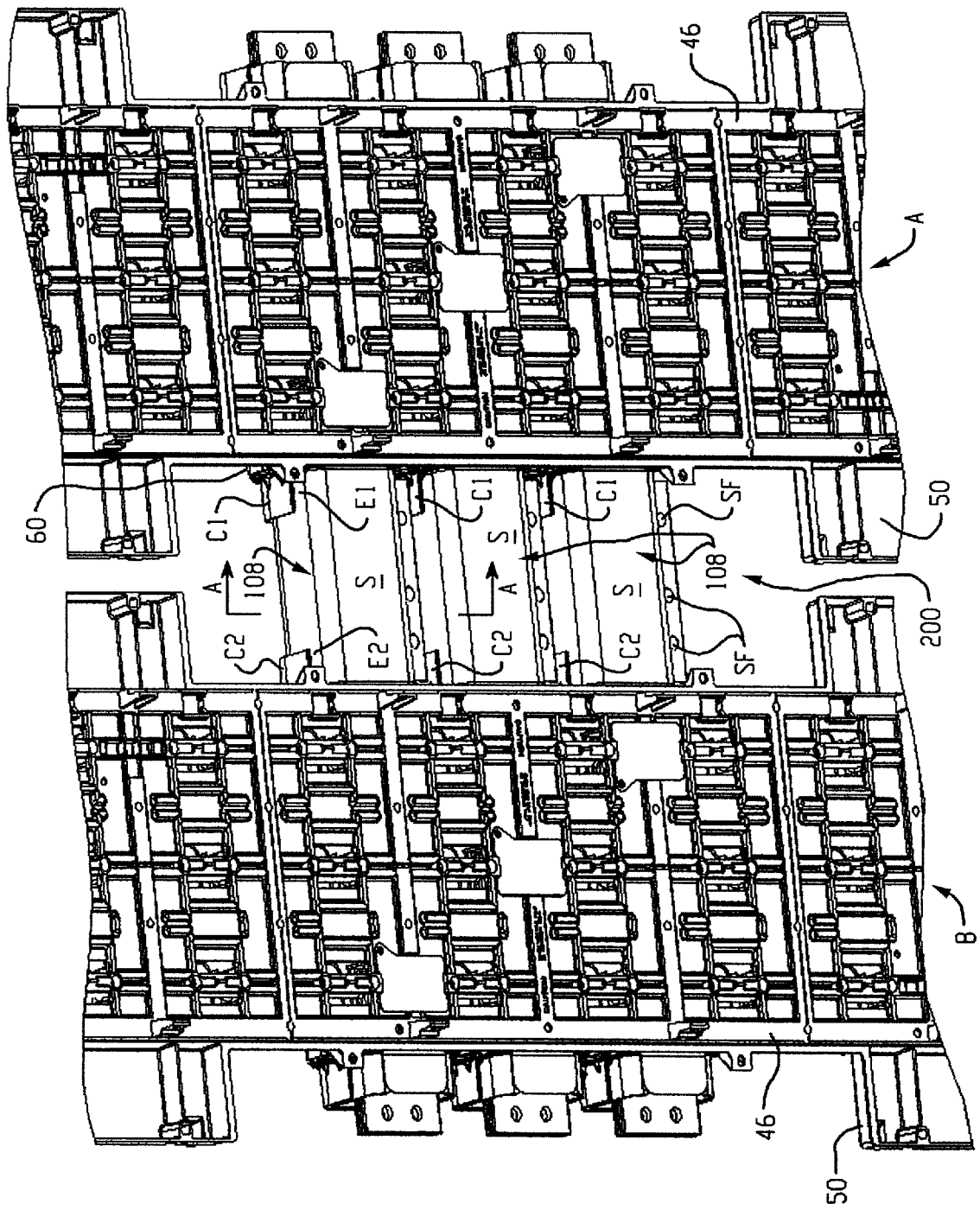
FIG. 6 is a front view of the flanking bus supports of FIG. 5 further including a system for isolating the spliced conductor assemblies in accordance with one embodiment of the present invention.

FIG. 6 is similar to FIG. 5 but shows a system 200 for isolating the spliced conductor assemblies 108 in accordance with one embodiment of the present invention. The system 200 comprises first and second insulating sheet support collars C1,C2 respectively installed on the first and second flanking bus supports A,B of each of the three illustrated spliced conductor assemblies 108. The first and second support collars C1,C2 are thus located respectively adjacent and at least partially surround or at least partially encircle the opposite first and second lateral sides of each of the spliced conductor assemblies 108. The system 200 further comprises a flexible insulating sheet S received and retained by the first and second collars C1,C2 such that the sheet S defines a tubular structure that extends continuously between the first and second collars C1,C2 and that surrounds or covers, and electrically isolates the spliced conductor assembly 108 surrounded by the sheet S. The system 200 preferably further includes one or more sheet fasteners SF that fasten or secure the sheet S to itself to secure the sheet S in its operative position about the spliced conductor assembly 108. In certain embodiments, the sheet fasteners SF are omitted and the sheet is mechanically interlocked to itself or otherwise secured to itself using a slit and tab structure and/or the sheet S is adhesively secured to itself and/or the sheet S is adhered to the collars C1,C2 and/or the sheet S is adhered to the spliced conductor assembly 108 to secure the sheet S in its operative position.

Figure 6A:
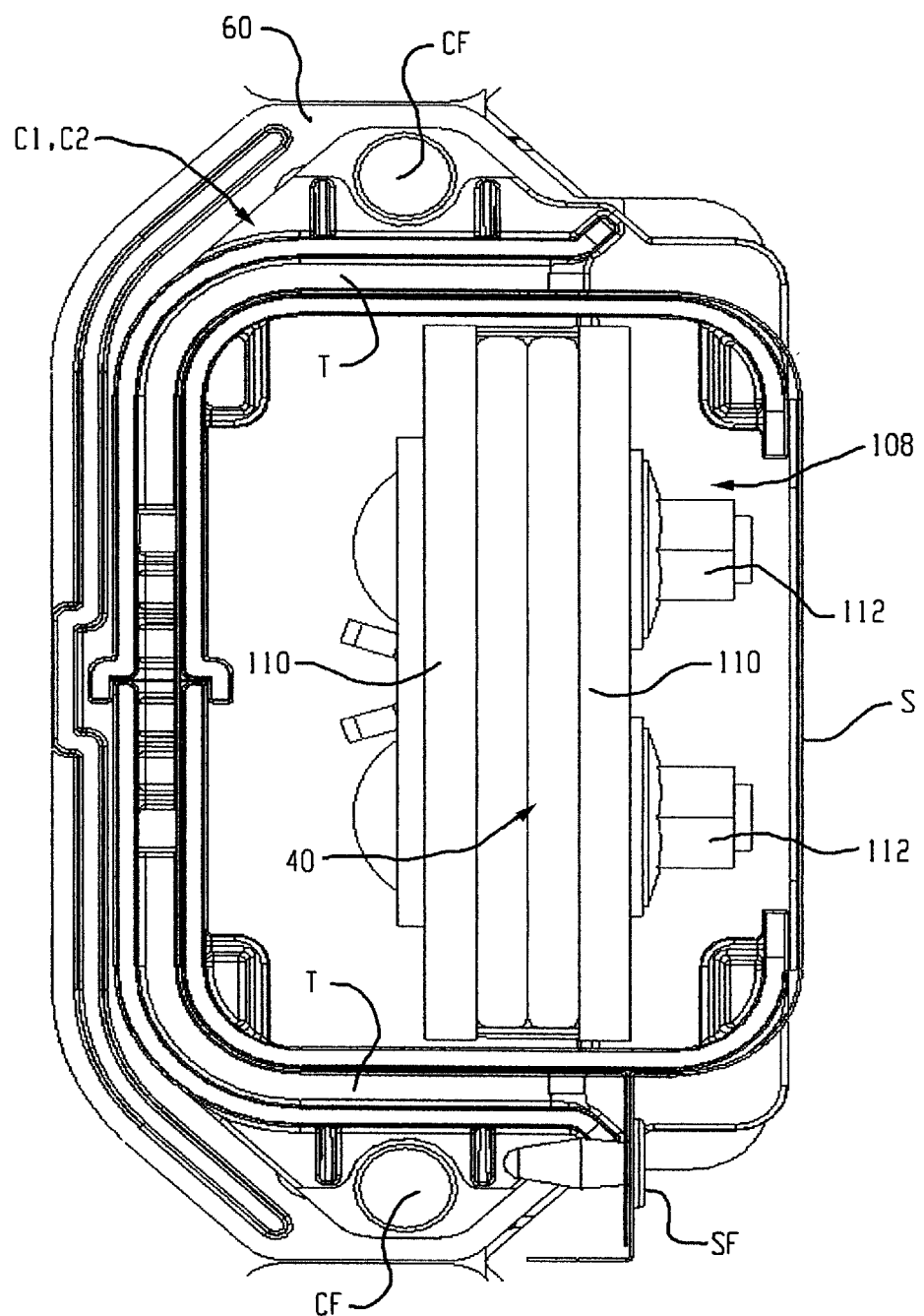
FIG. 6A is an enlarged section view taken at section line A-A of FIG. 6.

With reference now also to the section view of FIG. 6A taken at section line A-A of FIG. 6, it can be seen that each insulating sheet support collar C1,C2 is connected to or otherwise secured adjacent the respective vertical insulator 60 of the bus support A,B to which it is connected. In the illustrated embodiment, each collar C1,C2 is secured to the vertical insulator 60 or other part of the bus support A,B using one or more collar fasteners such as the two collar fasteners CF shown herein. Each insulating sheet support collar C1,C2 at least partially surrounds the spliced conductor assembly 108 (i.e., at least partially encircles the longitudinal axis X thereof), but each of the first and second collars C1,C2 can completely surround the spliced conductor assembly 108 (i.e., completely encircle the longitudinal axis X thereof). Each of the first and second collars C1,C2 comprises an open groove or open sliding track T that opens inwardly toward the other collar C1,C2 such that the tracks T of the first and second collars C1,C2 are arranged in opposed facing relation with each other and cooperate to define a sheet-receiving slot SL (see FIG. 7) that is adapted to slidably receive and retain the flexible electrically insulating sheet S. More particularly, the opposed facing tracks T of the first and second collars C1,C2 respectively receive the opposite first and second lateral edges E1,E2 of the flexible insulating sheet S (see also FIG. 8). The sheet S retained by the first and second collars C1,C2 is then fastened to itself, retained by the first and second collars C1,C2, and/or otherwise operatively secured in an operative position such that the sheet S defines a tubular structure that completely surrounds (completely encircles the longitudinal axis X of) the spliced conductor assembly 108 laterally between the first and second collars C1,C2 and electrically isolates the spliced conductor assembly 108 from adjacent structures including adjacent spliced conductor assemblies 108. The first and second collars C1,C2 are also electrically non-conductive. The insulating sheet S also electrically isolates the spliced conductor assembly 108 covered thereby from associated tools wires, and other items located in the region of the spliced conductor assembly during installation and/or maintenance. Accordingly, the electrically insulating sheet S wraps around a portion of, or all of, a splice conductor assembly 108, including between the bus support 50 and a rear wall of the electrical system 10, with a dielectric strength per mil effective to isolate power conductors based on maximum charge and proximity of the power conductors. As a result, the electrically insulating sheets S each serve to electrically isolate the horizontal bus conductors 40 from one another (or from other live fasteners or elements) near the spliced conductor assemblies 108 and also serve to reduce the risk of incidental contact between the spliced conductor assembly 108 and a tool or other element being used for repair or maintenance of the electrical system 10.

Figure 7:
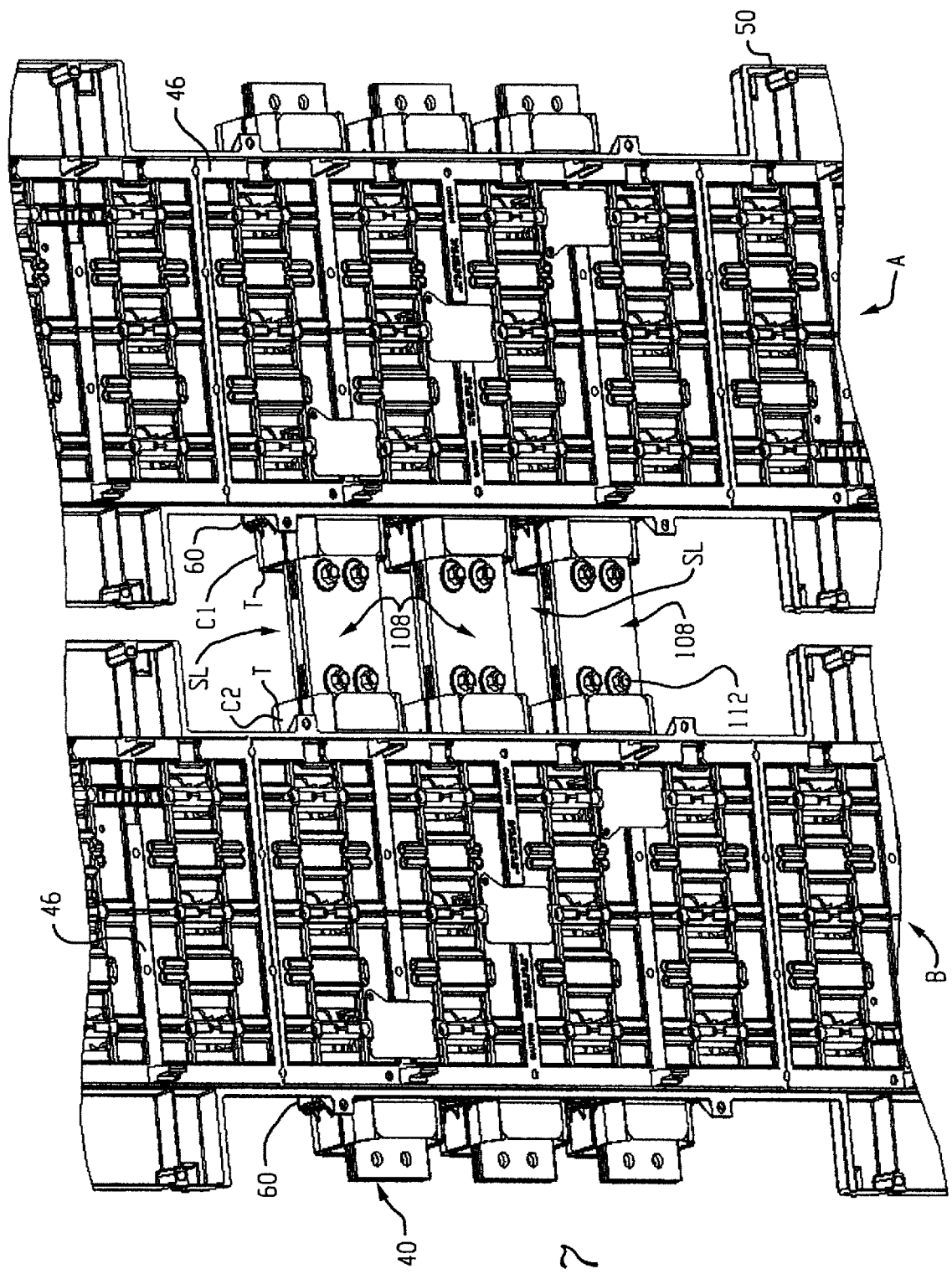
FIG. 7 is similar to FIG. 6 but the insulating sheets of the system for isolating the spliced conductor assemblies have been omitted to illustrate the installation of first and second collars about the spliced conductor assembly (only one of the spliced conductor assemblies includes installed collars in FIG. 7)
Figure 7A:
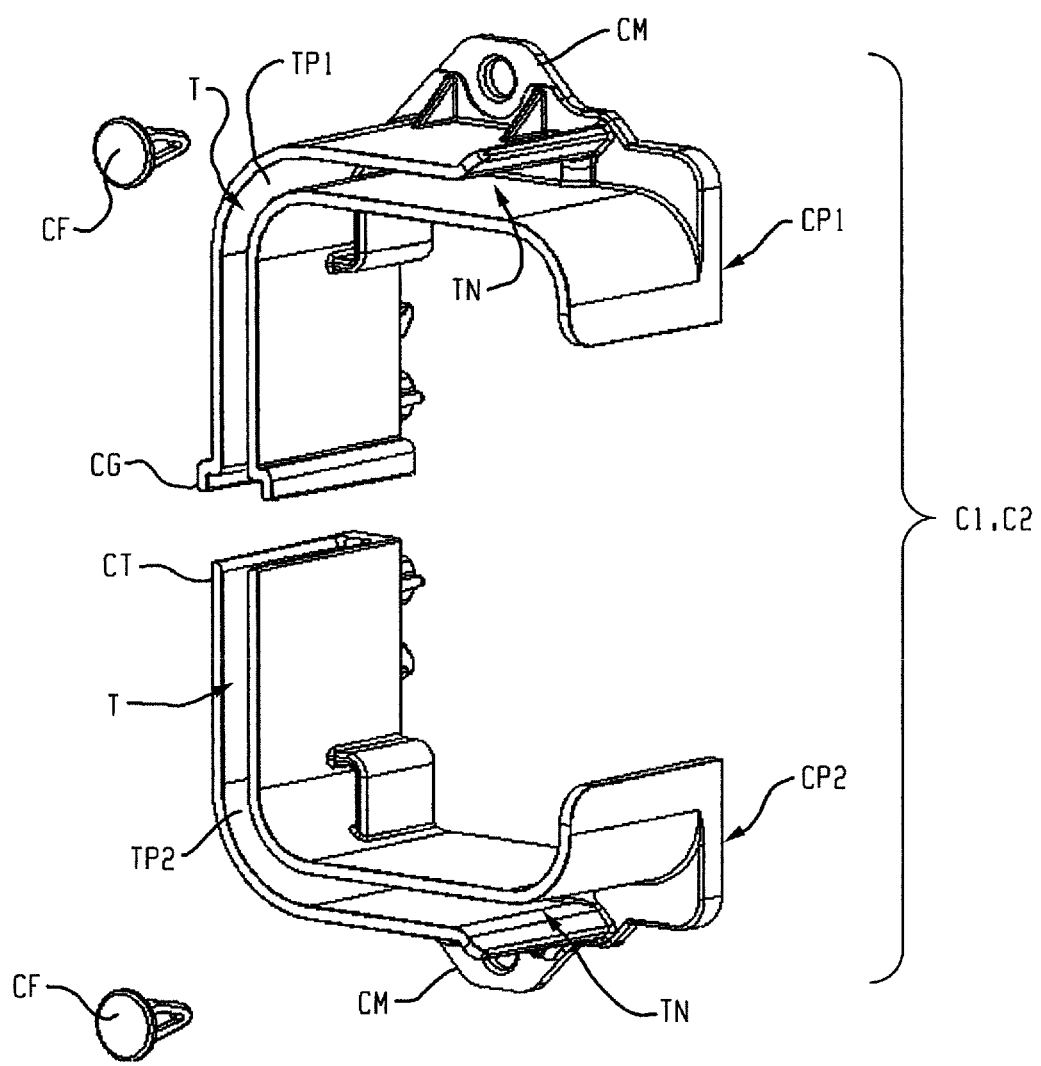
FIG. 7A is an exploded isometric view of an exemplary collar component of the system for isolating the spliced conductor assemblies according to an aspect of the present development.

FIG. 7 is similar to FIG. 6 but the insulating sheets S have been omitted to illustrate the installation of the collars C1,C2 about the spliced conductor assembly 108 (only the upper one of the spliced conductor assemblies 108 includes installed collars C1,C2 in FIG. 7). Although the collars C1,C2 can be provided as one-piece molded polymeric structures with an open C-shape structure that can be fitted about the spliced conductor assembly 108 during installation, each collar C1,C2 of the illustrated embodiment comprises a multi-piece molded polymeric structure such as the illustrated two-piece structure shown by itself in FIG. 7A. As shown in FIG. 7A, each collar C1,C2 comprises a first collar piece CP1 and a second collar piece CP2 that cooperate with each other to define the collar C1,C2 when the first and second collar pieces CP1,CP2 are assembled together about the spliced conductor assembly 108. The collar pieces CP1,CP2 are installed in a first orientation when installed as the first collar C1 and the collar pieces are flipped over or inverted when installed as a second collar C2.

In the illustrated example, each collar piece CP1,CP2 is generally L-shaped and includes at least one mounting tab CM including an aperture for receiving one of the collar fasteners CF used for securing the collar C1,C2 to the vertical insulator 60. The collar pieces CP1,CP2 include respective track portions TP1,TP2 each defining part of the open track T. One of the collar pieces CP2 comprises a tongue portion CT and the other collar piece CP1 comprises a groove structure CG, and these tongue and groove structures CT,CG are mated when the first and second collar pieces CP1,CP2 are operably connected and assembled about a spliced conductor assembly 108. The tongue and groove structures CT,CG are preferably defined at the respective inner ends of the track portions TP1,TP2 such that such mating connection of the tongue and groove structures CT,CG ensures alignment of the respective track portions TP1,TP2 to define the track T. The opposite, outer end of each track portion TP1,TP2 preferably includes a flared or widened track entrance TN that narrows as it extends inwardly to facilitate sliding insertion of the insulating sheet S as described in more detail below. Although the illustrated embodiment shows the groove portion CG provided on the first collar piece CP1 and the tongue portion provided on the second collar piece CP2, this arrangement can be reversed or the tongue and groove structures CT,CG can be omitted. As shown herein, the first and second collar pieces CP1,CP2 are dimensioned and conformed such that when operatively installed, they cooperate with each other to define a collar C1,C2 that partially encircles the longitudinal axis X of the spliced conductor assembly 108 (i.e., a collar C1,C2 that partially surrounds the spliced conductor assembly 108). Alternatively, the first and second collar pieces CP1,CP2 can be dimensioned and conformed such that when operatively installed, they cooperate with each other to define a collar C1,C2 that completely encircles the longitudinal axis X of the spliced conductor assembly 108 (i.e., a collar C1,C2 that completely surrounds the spliced conductor assembly 108).

Figure 8:
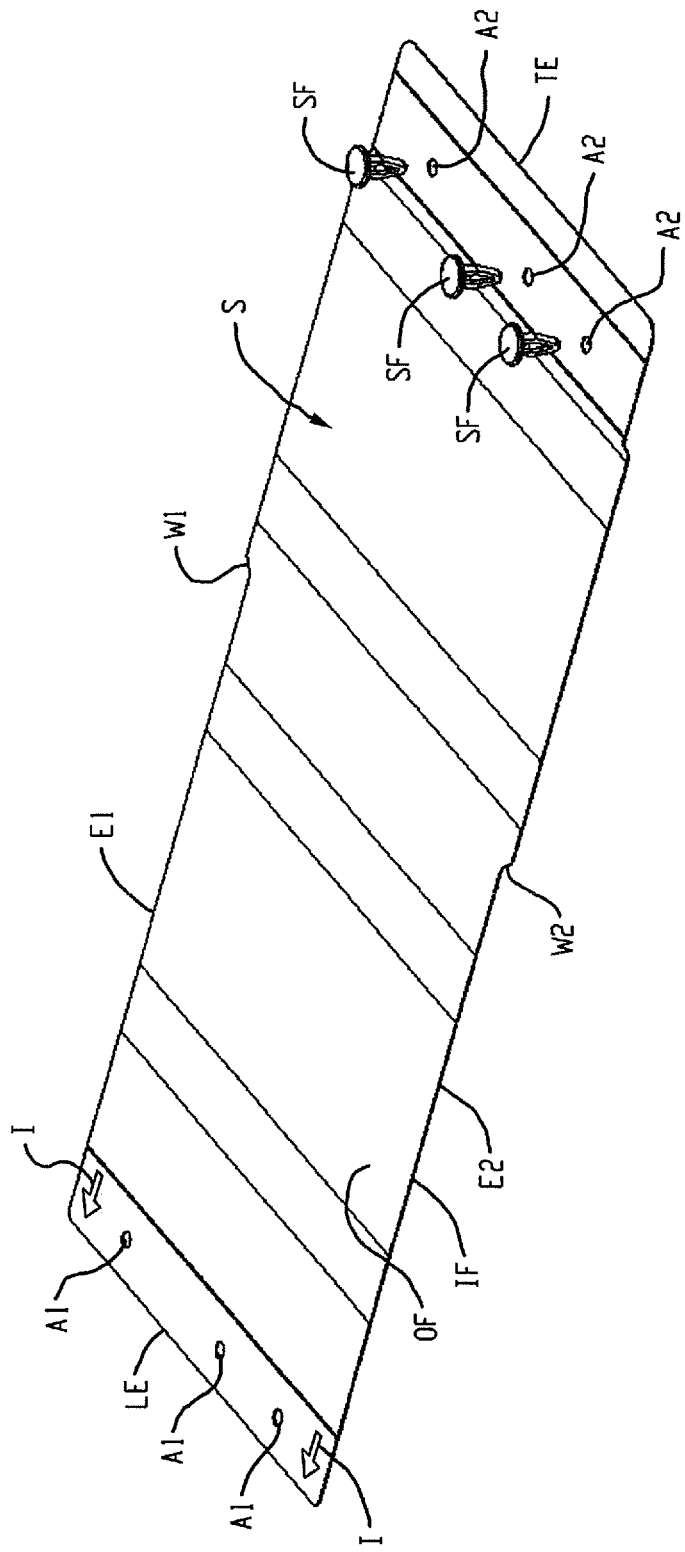
FIG. 8 provides a view of an electrically insulating sheet used in the system for isolating the spliced conductor assemblies according to an embodiment of the present development.

FIG. 8 provides a view of one of the electrically insulating sheets S in its flat, pre-installed condition and shows an exploded view of a plurality of sheet fasteners SF which can be the illustrated canoe clip push-in fasteners or other fasteners such as plastic rivets, screws, clips, or the like that are used to fasten the sheet S to itself for operative installation as explained below. In one example, each electrically insulating sheet S is manufactured from an electrically insulating material, such as polypropylene or another electrically insulating polymer. One suitable thickness for the sheet S is 0.017 inches, but other thicknesses may be used. The electrically insulating sheets S may also be black in color to maximize radiant cooling. Each sheet S is generally rectangular in overall shape and comprises a leading edge LE, a trailing edge TE, first and second opposite lateral edges E1,E2, and opposite first (outer) and second (inner) faces OF,IF. In the illustrated embodiment, the leading edge LE includes one or a plurality of first fastening apertures A1 and the trailing edge TE includes a corresponding one or a plurality of second fastening apertures A2. The first and second fastening apertures A1,A2 are respectively aligned with each other laterally between the first and second opposite edges E1,E2 such that that when the leading edge LE and trailing edge TE are overlapped, the first apertures A1 are respectively registered with the second apertures A2 to allow sheet fasteners SF such as the illustrated a canoe clip push-in fasteners or other fasteners to be installed in the registered first and second fastening apertures for the purpose of fastening the leading and trailing edges LE,TE of the sheet S together for operative installation of the sheet S. Other fasteners can be used in place of the canoe clips such as plastic rivets, screws, clips, or other fasteners. Alternatively, the first and second collars C1,C2 can be structures such that the sheet-receiving slot SL is shaped to retain the leading and trailing edges LE,TE of the sheet S adjacent each other such that the sheet S defines the required tubular structure that surrounds the sliced conductor assembly without requiring any fasteners or the like. The opposite lateral edges E1,E2 of the sheet S optionally comprise respective first and second protruding stop portions such as shoulders or wings W1,W2 that each provide a stop when the wings W1,W2 abut or engage the respective collars C1,C2 during installation of the sheet S when the sheet S is fully operatively installed in the slot SL. Alternatively, only one of the edges E1,E2 includes a wing or other projecting stop portion W1,W2. The illustrated sheet S may be installed with either its first or second faces OF,IF oriented upward. The sheet S preferably includes printed or other visual indicia I such as the illustrated arrow to indicate the leading edge LE and/or direction of feed for installation of the sheet S.

Figure 9:
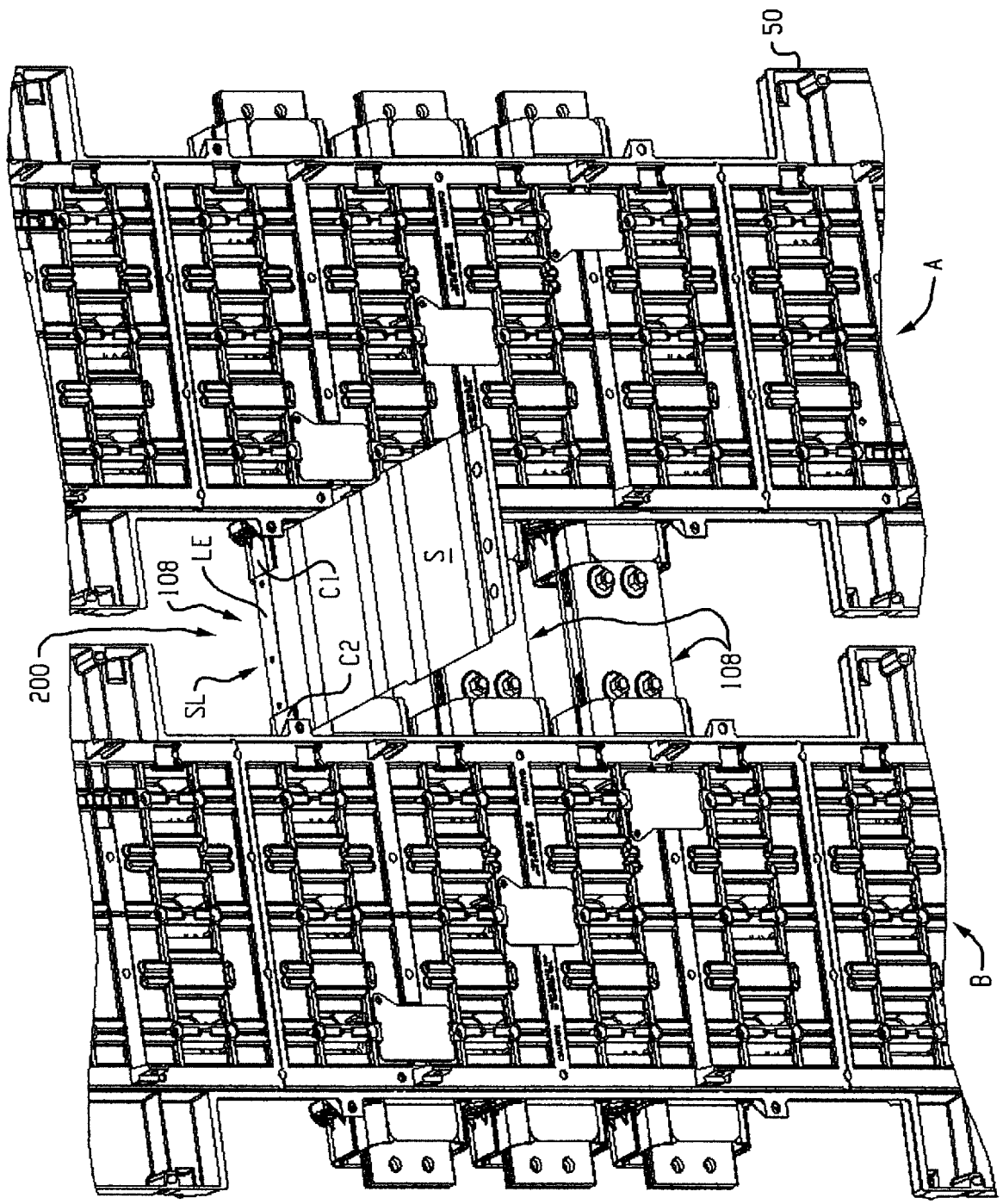
FIG. 9 is similar to FIG. 7 but shows the electrically insulating sheet of FIG. 8 at a first stage of being operatively installed.
Figure 9D:
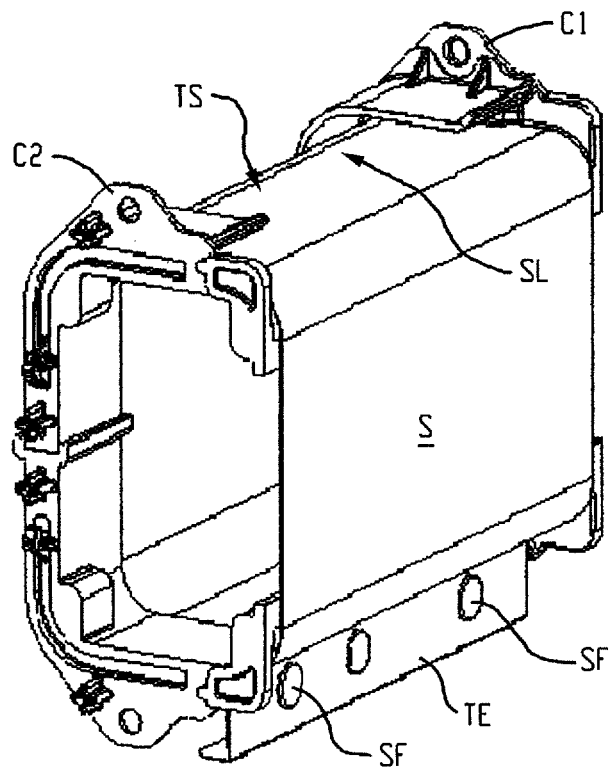
Figure 9E:
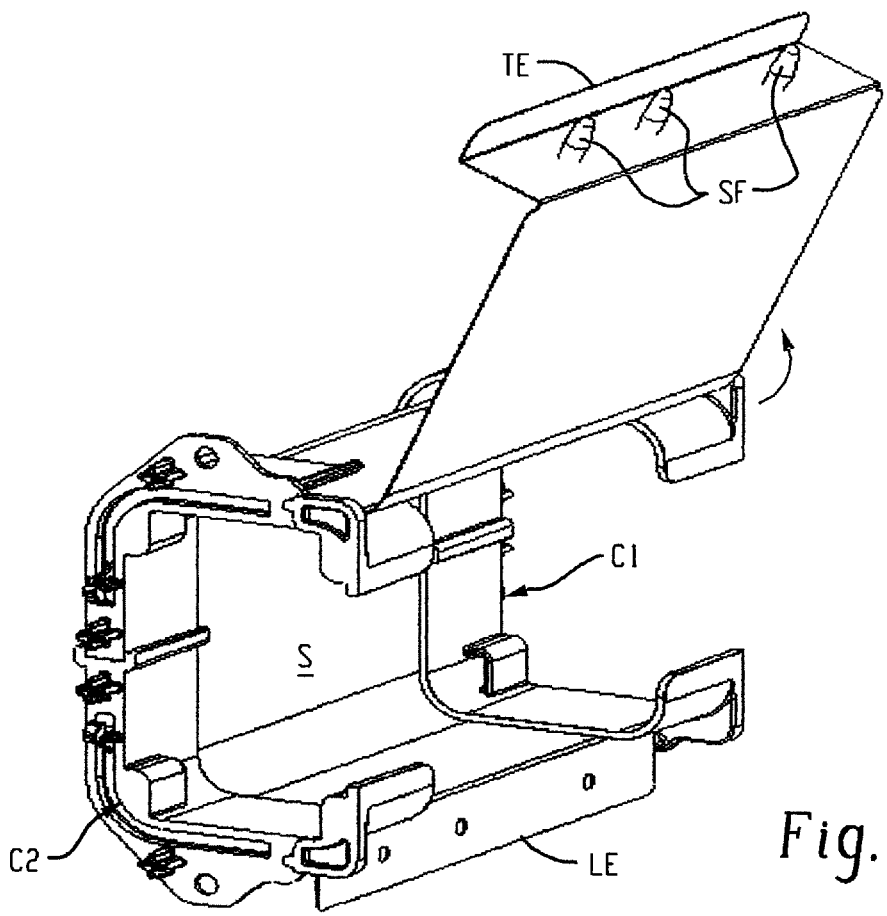
FIG. 9E is similar to FIG. 9D but illustrates a process for selectively opening the electrically insulating sheet for inspection or maintenance or removal and/or replacement of the sheet.

FIG. 9 is similar to FIG. 7 but shows the electrically insulating sheet of FIG. 8 at a first stage with its leading edge LE being operatively installed in the slot SL defined between the collars C1,C2. FIGS. 9A-9D are isometric views of the first and second collars C1,C2 and insulating sheet S (with adjacent structures not shown to simplify the drawings) that progressively illustrate a process for installing each electrically insulating sheet S in the system 200 for isolating the spliced conductor assemblies 108 in accordance with one embodiment of the present invention. FIG. 9E is similar to FIG. 9D but illustrates a process for selectively opening the electrically insulating sheet S for inspection or maintenance or removal and replacement of the sheet S. For clarity, in FIGS. 9A-9E, the first and second collars C1,C2 and the sheet S are shown without the surrounding environment of the electrical system 10.

Referring first to FIGS. 9 and 9A, to install the sheet S, the first and second collars C1,C2 are installed on the respective vertical insulators 60 in association with one of the spliced conductor assemblies 108 if the collars C1,C2 have not previously been installed such that the first and second collars C1,C2 are respectively located adjacent opposite first and second lateral sides of the spliced conductor assembly 108. As noted above, the opposed inwardly facing tracks T of the respective collars C1,C2 cooperate with each other to define a slot SL between the collars C1,C2 to receive and operatively retain the sheet S.

As shown in FIGS. 9 and 9A, the leading edge LE of the sheet LE is first inserted into a first end SL1 of the slot SL with the first and second lateral edges E1,E2 slidably inserted into a first end of the tracks T of the first and second collars C1,C2, respectively. As shown in FIGS. 9B and 9C, the sheet S is fed into the slot SL defined by the tracks T in an insertion direction such that the sheet S extends around the spliced conductor assembly 108 (the spliced conductor assembly 108 is not shown in FIGS. 9A-9E). When the sheet S is fully inserted into the slot SL/tracks T, the first and second wings W1,W2 (if included) respectively abut the first and second collars C1,C2 and stop further insertion of the sheet S at which stage the leading edge LE of the sheet S extends out of the opposite, second end SL2 of the slot SL to provide access to the first fastening apertures A1. As shown in FIGS. 9C and 9D, the trailing edge TE of the sheet S is moved into overlapping abutment the leading edge LE and the sheet fasteners SF are installed into registered or aligned pairs of first and second sheet fastening apertures A1,A2 to operatively install the sheet S in surrounding covering relation about the spliced conductor assembly 108. When the sheet S is operatively installed, the sheet S defines a hollow tubular shell structure TS open only at its opposite first and second lateral ends where it respectively connects with the first and second collars C1,C2 such that the spliced conductor assembly 108 is completely covered and electrically isolated from the surrounding environment outside of the tubular shell defined by the sheet S.

As shown in FIG. 9E, the sheet fasteners SF are selectively removable or disengageable from the sheet fastening apertures A1 and/or A2 to allow the sheet S to be uninstalled by reversing the installation steps just described or to allow for inspecting or servicing of the spliced conductor assembly 108 by pivoting the trailing edge TE of the sheet outwardly away from the leading edge LE to provide unobstructed access to the spliced conductor assembly 108 without removing the sheet S from the slot SL.

Figure 8A:
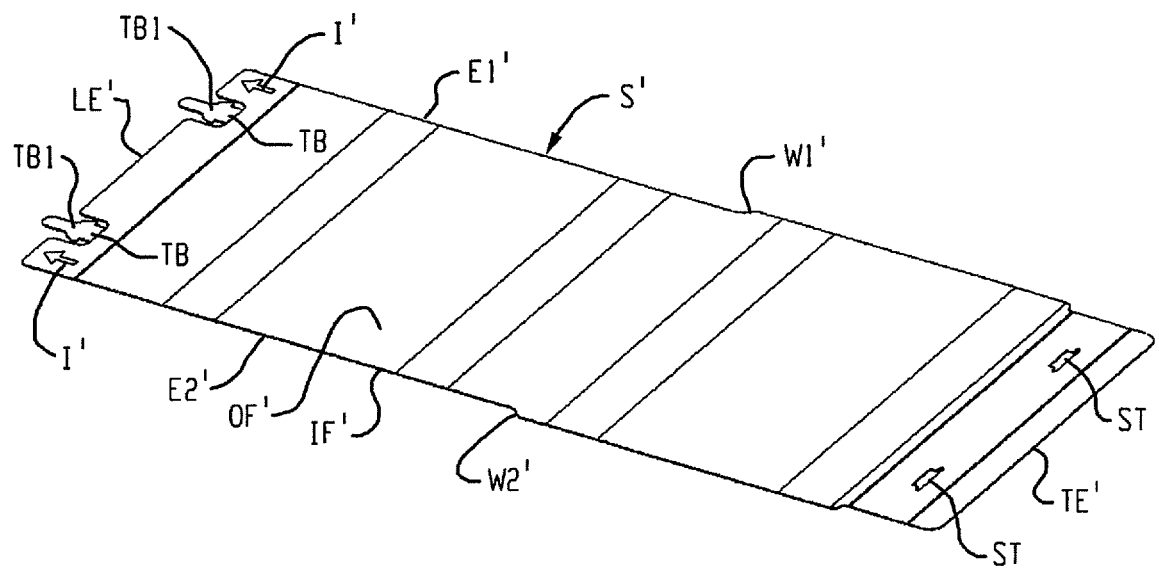
FIG. 8A is similar to FIG. 8 but shows an alternative electrically insulating sheet.
Figure 8B:
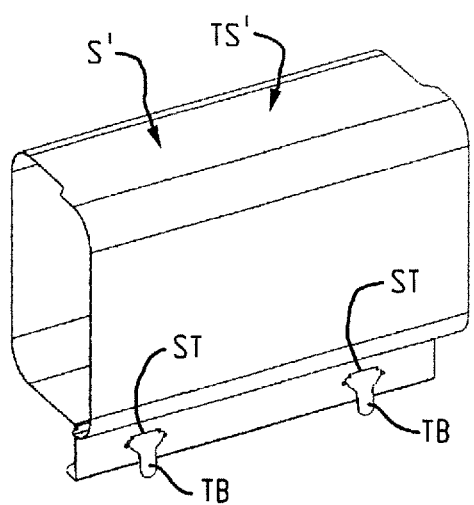
FIG. 8B shows the electrically insulating sheet of FIG. 8A operatively secured to itself to form a tubular insulating sheet structure.

FIG. 8A shows an alternative embodiment of the sheet S' that is identical in all respects to the sheet S, except that the first and second sheet fastening apertures A1,A2 are omitted. Instead, one of the leading edge LE and the trailing edge TE includes one or more narrow slits ST and the other of the leading edge LE and trailing edge TE includes corresponding tabs TB each with an enlarged head portion TB1. When the sheet S' is operatively installed, each of the tabs TB is inserted through a corresponding one of the slits ST and captured therein due to the enlarged head TB1 to form a hollow tubular shell insulating structure TS as shown in FIG. 8B.

In one embodiment, the system 200 for isolating the spliced conductor assemblies 108 using the sheet S or S' has maximum ratings of up to and including 600 Volts AC (VAC) and up to and including 3200 Amperes (A).

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The following is claimed:

1. A system for isolating power conductors, said system comprising:
   a power conductor that extends between first and second flanking support structures;
   first and second collars connected respectively to the first and second flanking support structures, said first and second collars each at least partially surrounding the power conductor and including respective first and second open tracks that cooperate with each other to define a sheet-receiving slot; and,
   an electrically insulative sheet located in the sheet-receiving slot and extending continuously between the first and second collars, said sheet secured in covering relation with the power conductor.

2. The system as set forth in claim 1, wherein the electrically insulative sheet is operatively secured and defines a tubular structure that covers the power conductor between the first and second collars.

3. The system as set forth in claim 2, wherein at least one sheet fastener is used to secure the electrically insulative sheet to itself such that the sheet defines said tubular structure.

4. The system as set forth in claim 2, wherein the electrically insulative sheet includes at least one slit and at least one corresponding tab that is received and retained in the at least one slit to secure the electrically insulative sheet to itself.

5. The system as set forth in claim 1, wherein each of the first and second collars comprise first and second collar components that are secured together.

6. The system as set forth in claim 5, wherein the first and second collar components include respective first and second track portions that cooperate to define said track when said first and second collar components are connected together.

7. The system as set forth in claim 2, wherein the sheet comprises first and second opposite lateral edges, at least one of said lateral edges comprising a stop portion that projects therefrom and that contacts one of the first and second collars to provide a stop when said sheet is operatively installed in the sheet-receiving slot.

8. The system as set forth in claim 2, wherein the sheet comprises first and second opposite lateral edges that respectively include first and second stop portions that project therefrom that respectively contact the first and second collars to provide a stop when said sheet is operatively installed in the sheet-receiving slot.

9. The system as set forth in claim 1, wherein the system has a maximum voltage rating of up to and including 600 Volts AC (VAC) and has a maximum current rating of up to and including 3200 Amperes (A).

10. A method for isolating a power conductor that extends between first and second flanking support structures, said method comprising:
   connecting first and second collars respectively to the first and second flanking support structures such that said first and second collars each at least partially surround the power conductor and such that respective first and second open tracks of the first and second collars are arranged in opposed facing relation so as to define a sheet-receiving slot adapted to receive an electrically insulative flexible sheet; and,
   slidably inserting an electrically insulative flexible sheet into the sheet-receiving slot so that said electrically insulative flexible sheet extends continuously between the first and second collars and forms a tubular structure arranged in covering relation with the power conductor between the first and second collars.

11. The method as set forth in claim 10, further comprising securing first and second portions of the electrically insulative sheet together such that said electrically insulative sheet is secured to itself.

12. The method as set forth in claim 11, wherein said step of securing said first and second portions of the electrically insulative sheet together comprises inserting at least one sheet fastener through the first and second portions of the sheet.

13. The method as set forth in claim 11, wherein said step of securing said first and second portions of the electrically insulative sheet together comprises inserting a tab located on the first portion of the sheet through a slit located on the second portion of the sheet such that said tab is received and retained in the slit to secure the electrically insulative sheet to itself.

14. The method as set forth in claim 10, wherein the step of connecting the first and second collars to the first and second flanking support structures comprises, for each of the first and second collars, connecting first and second collar components together to define the collar.

15. The method as set forth in claim 14, further comprising:
   defining the first open track of the first collar by aligning first and second track portions of the first and second collar components of the first collar; and,
   defining the second open track of the second collar by aligning first and second track portions of the first and second collar components of the second collar.

16. The method as set forth in claim 10, wherein said step of slidably inserting the electrically insulative sheet into the sheet-receiving slot comprises sliding said sheet into the sheet-receiving slot until a stop portion of the sheet contacts one of the first and second collars such that contact between the stop portion and the collar inhibits further sliding insertion of the sheet into the slot.

17. The method as set forth in claim 10, wherein said step of slidably inserting the electrically insulative sheet into the sheet-receiving slot comprises sliding said sheet into the sheet-receiving slot until first and second stop portions that project respectively outwardly from the first and second lateral sides of the sheet contact the first and second collars, respectively, such that contact between the first and second stop portions and the respective first and second collars inhibits further sliding insertion of the sheet into the slot.

18. A system for isolating an associated power conductor, said system comprising:
   first and second collars adapted to be connected respectively to first and second associated support structures with said first and second collars each at least partially surrounding an associated power conductor, said first and second collars including respective first and second open tracks that cooperate with each other to define a sheet-receiving slot; and,
   an electrically insulative sheet adapted to be located in the sheet-receiving slot and define a tubular insulating structure that extends continuously between the first and second collars in covering relation with the associated power conductor.

19. The system as set forth in claim 18, further comprising at least one fastener for securing the sheet to itself to define said tubular insulating structure.

* * * * *